United States Patent
Schuesslburner et al.

(10) Patent No.: US 11,807,470 B2
(45) Date of Patent: Nov. 7, 2023

(54) BUFFER DEVICE AND METHOD FOR BUFFERING CONTAINERS

(71) Applicant: KRONES AG, Neutraubling (DE)

(72) Inventors: Helmut Schuesslburner, Straubing (DE); Konrad Senn, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 147 days.

(21) Appl. No.: 17/594,114

(22) PCT Filed: Mar. 16, 2020

(86) PCT No.: PCT/EP2020/057040
§ 371 (c)(1),
(2) Date: Oct. 1, 2021

(87) PCT Pub. No.: WO2020/200716
PCT Pub. Date: Oct. 8, 2020

(65) Prior Publication Data
US 2022/0177236 A1    Jun. 9, 2022

(30) Foreign Application Priority Data
Apr. 1, 2019   (DE) .................... 10 2019 204 536.7

(51) Int. Cl.
*B65G 47/51*   (2006.01)
*B65G 47/08*   (2006.01)

(52) U.S. Cl.
CPC ........ *B65G 47/5113* (2013.01); *B65G 47/088* (2013.01)

(58) Field of Classification Search
None
See application file for complete search history.

(56) References Cited

U.S. PATENT DOCUMENTS 3,739,902 A      6/1973  Ingram et al.
6,817,464 B2 *  11/2004  Biondi ............... B65G 47/5131
                                                  198/347.1
(Continued)

FOREIGN PATENT DOCUMENTS

DE    29507589 U1   7/1995
EP     2920093 B1   4/2017
(Continued)

OTHER PUBLICATIONS

ISA European Patent Office, International Search Report Issued in Application No. PCT/EP2020/057040, dated Jul. 8, 2020, WIPO, 5 pages.

*Primary Examiner* — William R Harp
(74) *Attorney, Agent, or Firm* — McCoy Russell LLP (57) ABSTRACT

Buffer device for buffering containers, with an inlet, an inlet manipulator, a first buffer system, a transposition device, a second buffer system, an outlet manipulator, and an outlet, where containers can be transferred by the inlet manipulator from the inlet to the first buffer system and can be transported along a first direction in the first buffer system, where the transposition device can transfer containers from the first buffer system to the second buffer system, and the containers can be transported in the second buffer system along a second direction that is opposite to the first direction, and the containers can be removed from the second buffer system by the outlet manipulator and fed to the outlet, where the buffer capacity of the buffer device is adjustable.

13 Claims, 7 Drawing Sheets

(56) References Cited

U.S. PATENT DOCUMENTS

| | | | |
|---|---|---|---|
| 6,959,802 B1 | 11/2005 | Garvey | |
| 11,511,946 B2 * | 11/2022 | Gehin | B65G 47/82 |
| 2010/0193327 A1 | 8/2010 | Mougin et al. | |
| 2015/0037126 A1 | 2/2015 | Parker | |

FOREIGN PATENT DOCUMENTS

| | | |
|---|---|---|
| JP | S5142265 A | 4/1976 |
| JP | 2007137623 A | 6/2007 |

\* cited by examiner

BUFFER DEVICE AND METHOD FOR BUFFERING CONTAINERS

TECHNICAL FIELD

The present disclosure relates to a buffer device for buffering containers as well as to a method for buffering containers with a buffer device.

BACKGROUND AND SUMMARY

Devices for buffering containers and corresponding methods are known from prior art.

A buffer device is already known from US 2015/037126 in which a robot can receive a group of containers from a multiple-row flow of containers and feed them to a buffer region which extends in a direction that is perpendicular to the direction of transport of the containers.

It is known from EP 2 920 093 B1 to provide a buffer region between two container transport devices arranged consecutively in the direction of transport of the containers. The containers are examined by the first transport device for the buffer region and by the buffer region for the second transport device, so that the buffer region is always completely traversed by containers.

The known buffer systems are not very flexible with regard to the transportation of the containers and the buffer capacity and the path to be traveled by the containers can hardly also be adapted to requirements that change rapidly during operation when buffering the containers.

Object

Proceeding from known prior art, the technical object to be satisfied is to specify a buffer device and a method for buffering containers with which reliable and at the same time flexible buffering of the containers is enabled.

Solution

This object is satisfied according to the disclosure by a buffer device and method for buffering containers.

The buffer device according to the disclosure for buffering containers comprises an inlet, an inlet manipulator, a first buffer system, a transposition device, a second buffer system, an outlet manipulator, and an outlet, where containers can be transferred by the inlet manipulator from the inlet to the first buffer system and can be transported along a first direction in the first buffer system, where the transposition device can transfer containers from the first buffer system to the second buffer system, and the containers can be transported in the second buffer system along a second direction that is opposite to the first direction, and the containers can be removed from the second buffer system by the outlet manipulator and fed to the outlet, where the buffer capacity of the buffer device is adjustable.

The first buffer system and the second buffer system are provided such that they represent buffer systems that can be operated independently of one another, i.e. that the containers can be transported in the first buffer system independently of the transportation of containers in the second buffer system (for example, with regard to the transport speed of the containers). Accordingly, the transposition device is to be understood to be no device which merely deflects the motion of the containers in the first and the second buffer system. The transposition device is understood to be devices that can actively transport the containers from the first buffer system to the second buffer system, such as gripper systems that can grip containers or transfer bars that can push containers from the first buffer system to the second buffer system.

The buffer system is generally understood to mean systems in which the containers can be stored and moved at the same time. This includes, firstly, immovable buffer surfaces onto which the containers can be placed and relative to which the containers can also be moved (for example by suitable pushing devices). As an alternative or in addition, the buffer systems can also comprise one or more movable conveyor belts with which the containers can be moved along the first or the second direction in the first or the second buffer system, respectively.

The buffer system can also be a pallet circulation conveyor or a shuttle system. Pallet circulation systems in which groups of containers are transported by individual pallets are frequently used. The pallets are driven, for example pulled, by a central traction mechanism, for example, a chain, by use of couplings. Individual pallets can be stopped by external stoppers. Subsequent pallets run onto the stationary pallets and are thus halted. The shuttle system represents a further option of implementing a pallet circulation system. The individual pallets are driven by long stator linear motor shuttles. For this purpose, the pallets are mounted on shuttles or movers, which in turn interact with a long stator rail in electromagnetic interaction. The long stator rail contains several electrical coils that generate a moving magnetic field that interacts electromagnetically with the secondary parts that are disposed on the shuttles or movers and can react to electromagnetic fields. These secondary parts consist of one or more permanent magnets or non-switching electromagnets and/or iron cores.

The adjustment of the buffer capacity can be, but does not need to be, dependent on parameters during the transportation of the containers in the inlet and/or outlet or on transport devices upstream or downstream thereof. For example, the required buffer capacity can be adjusted in dependence of a container throughput in the inlet and a container throughput in the outlet. A nominal buffer capacity or a standard buffer capacity can be provided for the case that the container throughput in the inlet is equal to the container throughput in the outlet (or corresponding upstream or downstream transport devices for the containers). If the container throughput in the outlet is lower than in the inlet, the buffer capacity can be increased. If the container throughput in the inlet is lower than in the outlet, the buffer capacity can be reduced.

Reliable and at the same time flexible buffering of the containers is possible with this buffer device and the distance travelled by the containers in the buffer device can be kept as short as possible.

It can be provided that the inlet manipulator comprises a gripper system for gripping a number of containers; and or that the outlet manipulator comprises a gripper system for gripping a number of containers.

The outlet manipulator can also populate the outlet such that two packers connected in parallel via the outlet can be populated simultaneously or alternately (alternatingly in any other alternating sequence). The outlet manipulator can also place the containers directly into crates, trays, or cardboard boxes. The outlet manipulator itself could also be a part of the downstream packer. It is also conceivable in one embodiment that the outlet manipulator populates a DTS/AGV (driverless transport vehicle or automated guided vehicle). The outlet manipulator can alternately populate an AGV and at least one packer.

Gripper systems enable the containers to be raised and (simultaneously) moved from the inlet into the first buffer system or from the second buffer system into the outlet, so that the containers can be moved without touching downstream or upstream containers, but also without the containers touching each other. The gripper systems can have a gripper for one container each and accordingly have a large number of grippers, for example, 20 or 40 or 60 grippers. The number of grippers of the inlet manipulator can differ from the number of grippers of the outlet manipulator. The grippers in the inlet manipulator and/or in the outlet manipulator can also be arranged in several rows in order to simultaneously take over several rows (e.g. 2, 4, 6 or 8) of containers from the inlet or from the second buffer system. The number of rows of grippers in the inlet manipulator and the outlet manipulator do not have to be the same either.

The transposition device can be arranged to be movable parallel to the first and/or the second direction and the buffer capacity can be adjusted by the transposition device in that a transfer position of the containers is adjusted.

The transfer position is the position along the first buffer system at which the containers are taken up by the transposition device and fed to the second buffer system. The position at which the containers taken over from the first buffer system are introduced into the second buffer system (second transfer position) does not have to be identical to the first transfer position at which containers are removed from the first buffer system. However, in certain embodiments, the transposition device may only move the containers in a direction perpendicular to the first direction and perpendicular to the second direction or in the planes formed by the first direction and the second direction, respectively, so that the distance travelled by the containers using the transposition device remains as short as possible and the entire distance travelled by the containers in the first and the second buffer system is then kept short.

The inlet manipulator and/or the outlet manipulator and/or the transposition device can be configured to format and/or regroup containers.

Formatting or regrouping presently means that the arrangement of the containers in groups as was present in the inlet (for example, the number of containers per group or rows of containers per group) is no longer the same in the outlet.

With this embodiment, not only buffering containers, but simultaneous formatting or rearranging them in dependence of requirements in the inlet and outlet can be ensured.

It is provided in one embodiment that a first reject region, into which containers from the first buffer system can be moved, is arranged along the first direction downstream of the first buffer system; and/or where a second reject region, into which containers from the second buffer system can be moved, is arranged along the second direction downstream of the second buffer system.

Containers that have fallen over or are faulty can then be recognized and removed from the flow of containers. In this context, a fault detection, such as a camera for recording containers in the first and/or the second buffer system can also be provided together with a control unit, such as a computer, which disposes of image recognition software for processing the images recorded by the fault detection. Depending on a fault of at least one container recognized by the fault detection, at least this container or also the associated group of containers can be fed to one of the reject regions in order to prevent the transportation of further containers from being obstructed.

Furthermore, the inlet can be configured to transport containers in a single row and/or the outlet can be configured to transport containers in multiple rows.

Not only buffering the containers, but also adapting to certain requirements in the inlet and outlet is made possible at the same time with this embodiment.

It can be provided in a further embodiment that an AGV (automated guided vehicle) or DTS (driverless transport system) is populated with rows of containers between the two buffer systems. For this purpose, the transposition device can comprise a special manipulation head which manipulates the rows of containers such that the rows of containers become shorter and can then be placed onto the AGV. Pushing them onto the AGV would also be possible. The rows of containers are in the process supported by the transposition device while they are being pushed across. It would also be possible to raise the rows of containers on the first buffer system and lower them onto the AGV. With this embodiment, it is not only possible to move to a packing machine, but also to move to several different packing machines by way of the AGV. This makes it possible to react more flexibly to different types or container shapes with a changeover of the production.

A further embodiment provides that the AGV is integrated into the second buffer system. The second buffer system there comprises two knife edge transfers. The AGV is then embedded between the two knife edge transfers. The rows of containers are then manipulated over the surface of the AGV or placed thereonto by way of the transposition device and the outlet manipulator. This also makes it possible to populate several different packing machines using the AGV, for example, in that the AGV, after having been populated with rows of containers, moves to a packing machine.

In addition, the transposition device can be configured to Rearrange containers in dependence of one or more properties and/or to change the spacing of containers in the first buffer system and/or in the second buffer system.

Rearranging comprises all rearrangements of containers that do not merely relate to regrouping or formatting into bundles and can therefore, for example, take place in dependence of the color, size or filling of the containers and is therefore container-specific. An arrangement of the containers, as is required, for example, later in a packer, can then be ensured already in the buffer system.

In one embodiment, the inlet and/or the outlet comprises an aisle system for converting single-row transportation of containers into multiple-row transportation of containers, where the aisle system comprises a first conveyor in which containers are transported in a single row, and a second conveyor downstream of the first conveyor in which the containers are transported in at least two rows that are parallel to each other, where at least two conversion tracks are arranged between the first conveyor and the second conveyor and where an allocation device is provided which can feed the containers transported in the first conveyor alternately to a first conversion track and to a second conversion track, where length L1 of the first conversion track and length L2 of the second conversion track differ from one another and the difference $\Delta L = L2 - L1 > 0$ corresponds to an integral multiple of the containers to be transported with the inlet.

With this embodiment, a flow of containers initially transported in a single row can be distributed over several rows of containers running parallel to one another, which enables the inlet manipulator to take over several rows of containers at the same time. At the outlet, it is also possible to switch over from single-row transportation to multiple-row transportation.

It is understood that, if an aisle system is provided which is traversed in the reverse direction, multiple-row transportation of containers can be grouped to single-row transportation of containers. Such a reversed aisle system can be provided, for example, at the outlet so that the outlet manipulator feeds several groups of containers to the outlet, which are then rearranged into a single-row flow of containers by the reversed aisle system.

The method according to the disclosure for buffering containers with a buffer device which comprises an inlet, an inlet manipulator, a first buffer system, a transposition device, a second buffer system, an outlet manipulator, and an outlet, includes that containers are transferred by the inlet manipulator from the inlet to the first buffer system and are transported along a first direction in the first buffer system, where the transposition device transfers containers from the first buffer system to the second buffer system, and the containers are transported in the second buffer system along a second direction that is opposite to the first direction, and the containers are removed from the second buffer system by the outlet manipulator and fed to the outlet, where the buffer capacity of the buffer device is adjusted in dependence of the number of containers to be buffered.

Flexible and at the same time reliable buffering of containers is possible with this method.

The buffer capacity can be adjusted by the transposition device adjusting the transfer position of the containers from the first buffer system into the second buffer system.

This allows the buffer capacity to be adjusted in a technically reliable manner.

It can also be provided that the transport speed of the containers in the first buffer system along the first direction is constant and the transport speed of the containers along the second buffer system in the second direction is varied in dependence of the relationship.

The buffer capacity of the buffer device can be modified by adjusting the transport speed in the second buffer system.

In one embodiment, the inlet manipulator and/or the outlet manipulator and/or the transposition device can group and/or format containers during transportation.

This results in the arrangement of the containers for the outlet or downstream devices, such as a packer, already during the buffering process.

In addition, a fault detection can be provided which detects a fault in at least one container in the first and/or the second buffer system and where a container, when a fault is detected, is fed from the first buffer system to a first reject region or from the second buffer system to a second reject region.

A detrimental effect by a container that has fallen over or the like on the buffering process or the onward transportation of the containers can then be avoided.

It is provided in one embodiment that the transposition device rearranges containers and/or changes the spacing of the containers in the first buffer system and/or in the second buffer system in dependence of one or more properties.

In this way, the containers can be arranged on a container-specific basis such that they are ready for downstream treatment steps (such as packaging, for example).

In addition, the inlet and/or the outlet comprises an aisle system for converting single-row transportation of containers into multiple-row transportation of containers, where the aisle system comprises a first conveyor in which containers are transported in a single row, and a second conveyor downstream of the first conveyor in which the containers are transported in at least two rows that are parallel to each other, where at least two conversion tracks are arranged between the first conveyor and the second conveyor and where an allocation device is provided which feeds the containers transported in the first conveyor alternately to a first conversion track and to a second conversion track, where length L1 of the first conversion track and length L2 of the second conversion track differ from one another and the difference $\Delta L = L2 - L1 > 0$ corresponds to an integral multiple of the containers transported with the inlet, where the allocation device first feeds a number of containers, the total length of which corresponds to $\Delta L$, to the second conversion track and feeds a second number of containers immediately following the first number in the first conveyor to the second conversion track, where the first number and the second number are equal.

Conversion from single-row transportation to multiple-row transportation is possible with this embodiment in a selective manner without the need for robotic arms or transfer devices or stopping the containers, so that the multiple-row groups of containers can be transferred efficiently by way of the inlet manipulator onto the first buffer system.

DETAILED DESCRIPTION

Figure 1A:
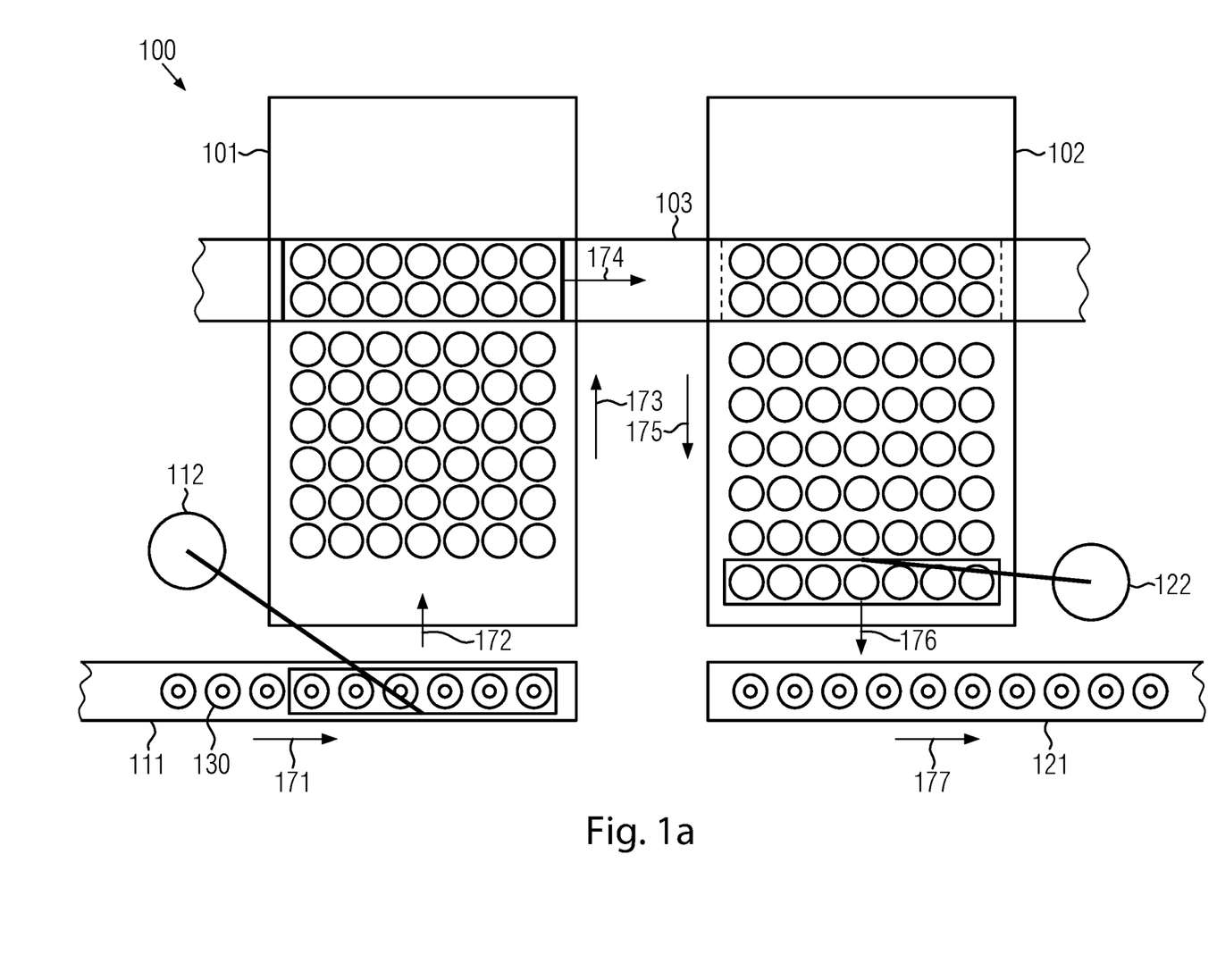
FIG. 1a shows a schematic representation of an embodiment of the buffer device.

FIG. 1a shows an embodiment of a buffer system 100 according to the disclosure. Buffer system 100 is configured to buffer (i.e. to temporarily store or to buffer store) containers 130, such as bottles, cans, tubes or other containers. In an embodiment, buffering there takes place between two machines which can be configured to treat the respective containers. For example, a first container treatment machine (for example, a printing machine that applies a print image onto each container) can be arranged upstream of buffer device 100 and a second container treatment machine, such as a packer that packs containers to form bundles, can be arranged downstream of the buffer device. The containers are transported in transport devices from the first container treatment machine to the second container treatment machine. They can be, for example, conveyor belts or the like.

Neither the container treatment machines employed nor the type of transportation between the container treatment machines is presently to be understood as being restrictive in any way. They therefore only serve to better illustrate the disclosure.

According to the disclosure, containers 130 run via an inlet of buffer device 101. The containers can be transported in this inlet consecutively in a single row or also in multiple rows (for example in several aisles that are separated from one another). It is also possible for the containers to be regrouped from originally single-row transportation to multiple-row transportation, as is described, for example, in FIG. 4.

According to the disclosure, containers 130 are then moved with the aid of an inlet manipulator 112 from the inlet into a first buffer system 101. This is shown by arrow direction 172. The inlet manipulator can be a pusher, such as a transfer bar, or a gripper system, or any other configuration with which containers can be transferred from inlet 111 into first buffer system 101 in a selective manner.

In first buffer system 101, the containers move along the first direction illustrated (arrow direction 173). First buffer system 101 can be configured as a slide surface on which the containers can be pushed along, for example, with the aid of further transfer devices provided. As an alternative or in addition, first buffer system 101 can also be configured as a conveyor belt which can move at a certain speed along first direction 173. The speed can be configured to be variable and does not have to be constant over time. The motion of the containers in the first buffer system in first direction 173 can therefore also be at intervals. For example, if new containers are to be transferred into first buffer system 101, the containers already in buffer system 101 can be moved onward accordingly. However, a continuous motion of the containers is advantageous in order to prevent them from falling over unintentionally.

Buffer system 101 can also be a pallet circulation conveyor or a shuttle system. Pallet circulation systems are frequently used in which groups of containers are transported by individual pallets. The pallets are driven, for example pulled, by a central traction mechanism, for example, a chain, by use of couplings. Individual pallets can be stopped by external stoppers. Following pallets then run onto the stationary pallets and are thus halted. The shuttle system represents a further option of implementing a pallet circulation system. The individual pallets are driven by long stator linear motor shuttles. For this purpose, the pallets are mounted on shuttles or movers, which in turn interact with a long stator rail in electromagnetic interaction.

The long stator rail contains several electrical coils that generate a moving magnetic field that interacts electromagnetically with the secondary parts that are disposed on the shuttles or movers. These secondary parts consist of one or more permanent magnets or non-switching electromagnets and/or iron cores.

According to the disclosure, the containers are transferred from first buffer system 101 by a transposition device 103 onto a second buffer system 102 which moves according to arrow direction 175 illustrated in a second direction which may be opposite to first direction 173. The transposition device is there configured such that it can manipulate at least a number of containers (for example 10, 20, 30 or 40) at the same time so that they are transferred from the first buffer system (for example, in direction 174) onto second buffer system 102. Transposition device 103 can be configured such that the containers are only moved in direction 174, i.e. perpendicular to directions 173 and 175. However, it can also be provided (for preventing containers from falling over when moving from the first buffer system onto the second buffer system) that the transposition device performs a composite, non-linear motion so that the containers are transferred in an arc from first buffer system 101 onto second buffer system 102 so that they maintain the direction of motion provided in first buffer system 101 at least when the transposition device takes over the containers from first buffer system 101 and only gradually perform a motion in the direction of second direction 175 when they are transferred to buffer system 102.

This embodiment is advantageous when the first and the second buffer system are configured as conveyor belts, since the containers falling over can be prevented in this way. For this purpose, the transposition device can be moved not only along direction 174, but also along directions 173 and 175. For this purpose, the transposition device can comprise, for example, a frame movable along directions 173 and 175 in which one or more transfer devices, such as gripper systems or transfer bars which can move the containers in direction 174, are arranged. A desired motion can then be realized by suitable superimposition of the motion of the frame in directions 173 and 175 and the motion of the transfer device in direction 174.

In the second buffer system, the containers are then transported in direction 175. The second buffer system can be configured according to the embodiments as described with reference to the first buffer system. The first and the second buffer system do not have to be of identical configuration. The first buffer system can be configured as a slide surface and the second buffer system as a conveyor belt or vice versa. Other embodiments are also conceivable there. In certain embodiments, the transport speed of the containers in the first buffer system along direction 173 and the transport speed of the containers in the second buffer system along direction 175 do not have to be identical.

One or more containers can then be transferred with the aid of an outlet manipulator 122, which can be configured according to the embodiments described for the inlet manipulator, from the second buffer system in direction 176 to an outlet 121 in which they can then be moved onward in direction 177. The outlet can be configured in analogy to the inlet as single-row or multiple-row transportation of the containers. For example, the outlet can comprise one or more conveyor belts which are separated from one another by aisles or separating elements and which enable the containers to be transported in a single row.

Outlet manipulator 122 can create a continuous flow on belt 121. This continuous flow can be provided as a closed flow of containers to one or more aisles. In one configuration, the outlet manipulator can also provide a continuous flow of grouped container groups, where, while the entire flow is continuous, the containers in this flow, however, are combined to form groups in which the containers have, for example, a smaller spacing between each other and/or exhibit a certain arrangement relative to one another.

Figure 1B:
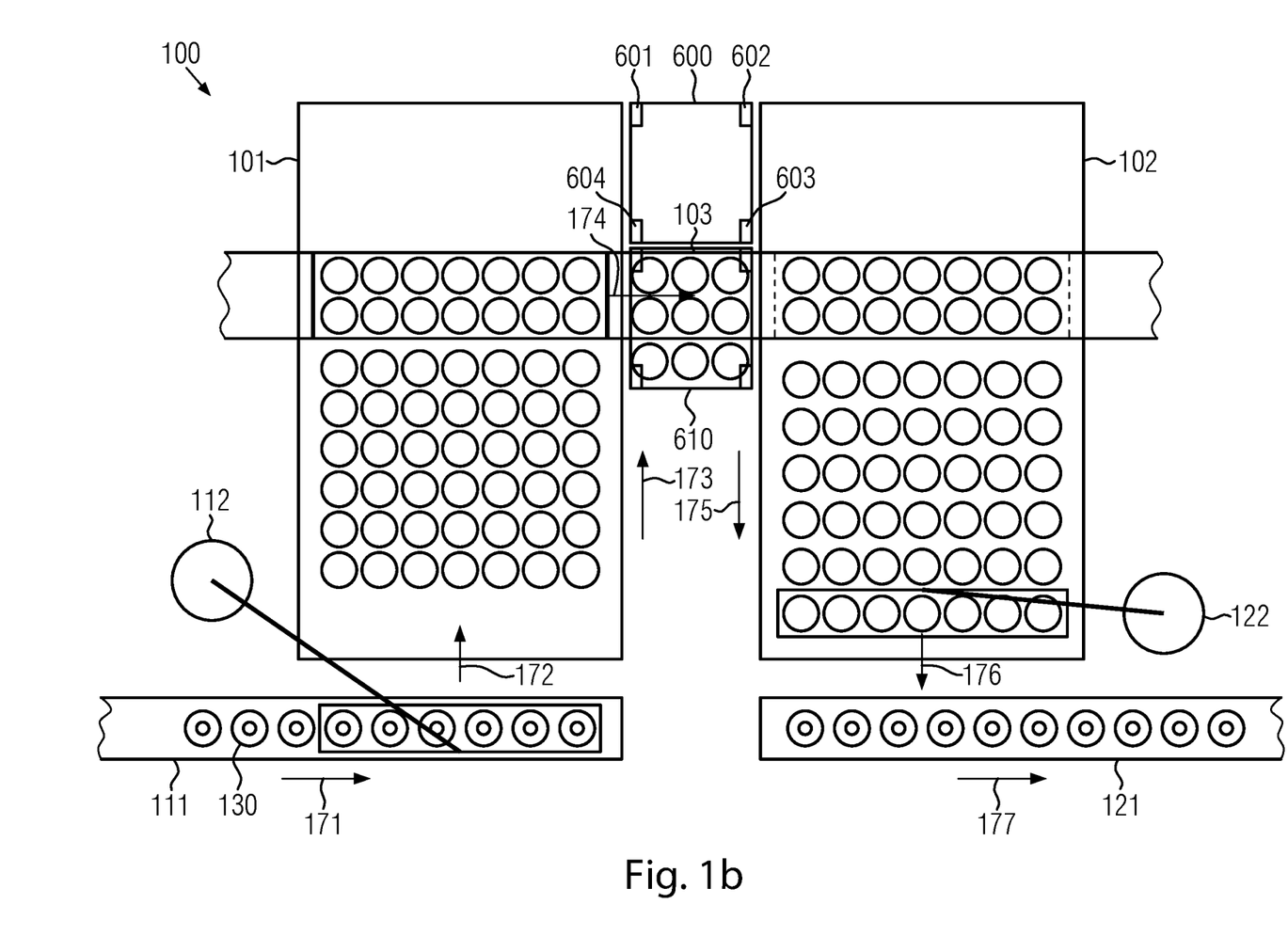
FIG. 1b shows a further schematic representation of an embodiment of the buffer device.

FIG. 1b shows an embodiment similar to FIG. 1a, for which reason reference is made to the preceding part of the description with the same reference numerals and only the differences are described. In FIG. 1b, two AGVs (automated guided vehicle) or DTS (driverless transport systems) 600, 610 are shown. In this embodiment of buffer device 100, AGVs can be loaded and/or moved and/or unloaded between two buffer systems 101 and 102. For this purpose, transposition device 103 can have a special manipulation head. A transposition device is described in FIG. 5. A transposition device in FIG. 1b is able to transfer the rows of containers from first buffer system 101 onto second buffer system 102. For this purpose, the rows of containers can be manipulated such that they are raised by first buffer system 101 and then lowered onto second buffer system 102. Being selectively pushed across by transposition device 103 would also be conceivable. In such a case, the rows of containers would be transferred from first buffer system 101 onto second buffer system 102 while being supported by the transposition device. In FIG. 1b, the transposition device is configured such that the manipulation head of the transposition device manipulates the rows of containers such that the rows of containers become shorter. The shortened rows of containers can then be placed onto an AGV 610. This transfer to the AGV can again be carried out by way of a raising and/or lowering process of transposition device 103. AGV 610 can then move to a chopping machine and populate it. While AGV 600 assumes the position of previous AGV 610 to receive the next rows of containers. For this purpose, each AGV comprises a number of wheels, for example, 4 wheels 601, 602, 603, 604 or another type of drive, such as a chain drive. With this embodiment, it is not only possible to move to a packing machine via outlet 121, but also to move to several different packing machines by way of AGV 600, 610. This makes it possible to react more flexibly to different types or container shapes when production is changed over.

Figure 1C:
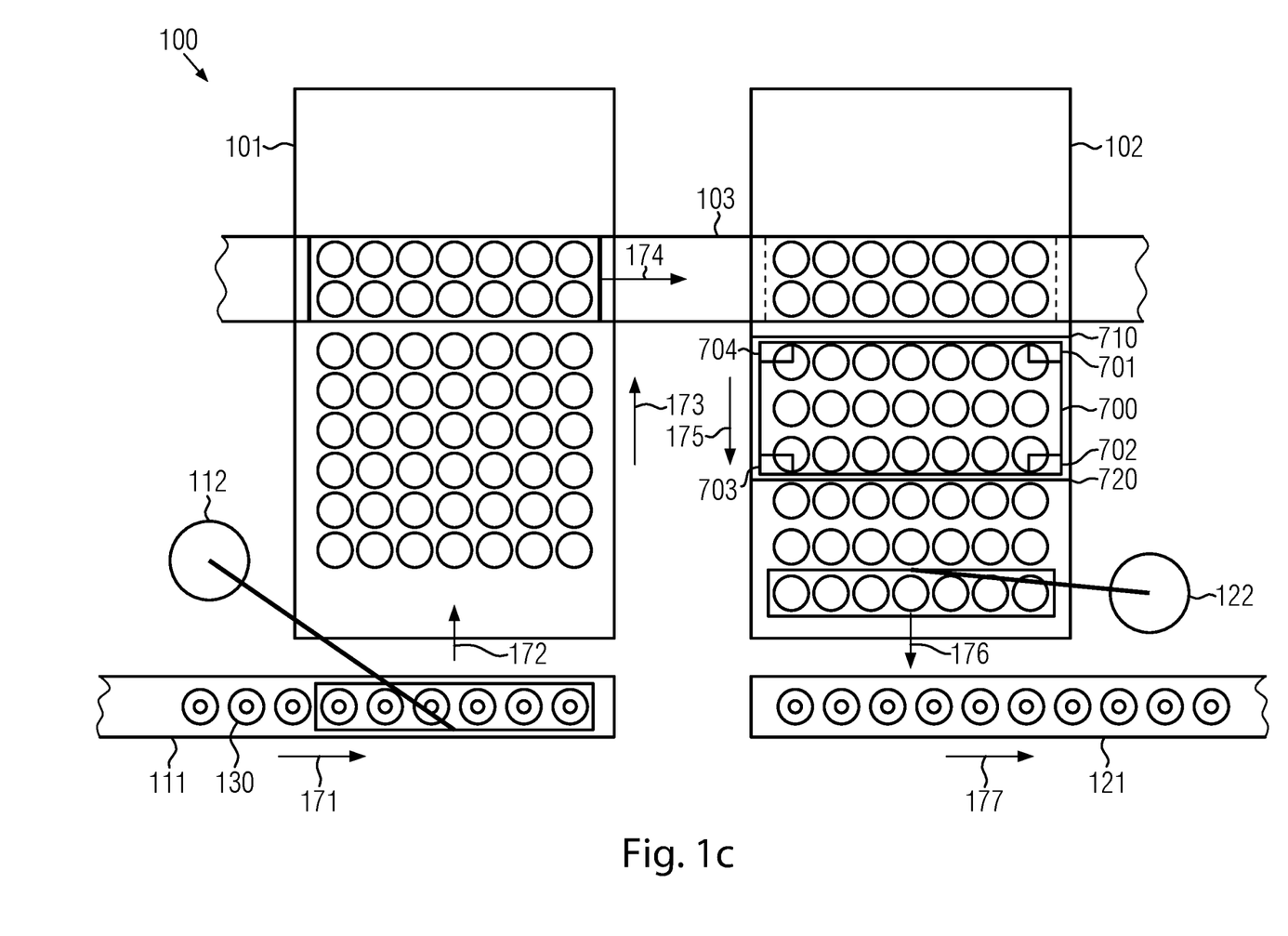
FIG. 1c shows a further schematic representation of an embodiment of the buffer device.

FIG. 1c shows an embodiment similar to FIG. 1a, for which reason reference is made to the preceding part of the description with the same reference numerals and only the differences are described. An AGV is shown in FIG. 1c like in FIG. 1b. In this embodiment, AGV 700 is integrated into second buffer system 102. AGV 700 also comprises a drive for locomotion, as has already been described for the AGV in FIG. 1b. For example, it can comprise four wheels 701, 702, 703, 704 (and a suitable motor, such as an electric motor). For this purpose, the second buffer system comprises two knife edge transfers 710 and 720, which enable the rows of containers to bridge the transitions between AGV 700 and second buffer system 102. For this purpose, the rows of containers are either moved from second buffer system 102, if it is configured as a conveyor belt or mat chain, to knife edge transfer 710. The rows of containers are then moved by outlet manipulator 122 from knife edge transfer 710 to AGV 700 or into outlet 121. It would also be conceivable (in the alternative or in addition) that, if second buffer system 102 is a fixed surface, the rows of containers are moved by transposition device 103 to knife edge transfer 710. The rows of containers are then moved by outlet manipulator 122 from knife edge transfer 710 to AGV 700 or into outlet 121. With the device described in FIG. 1c, it is also possible to populate other packing machines by way of AGV 700. This makes it possible to react more flexibly to different types or container shapes, for example, when production is changed over.

It is provided according to the disclosure that the buffer capacity of the buffer device and the buffer capacity of the first and/or the second buffer system can be adjusted.

Figure 2A:
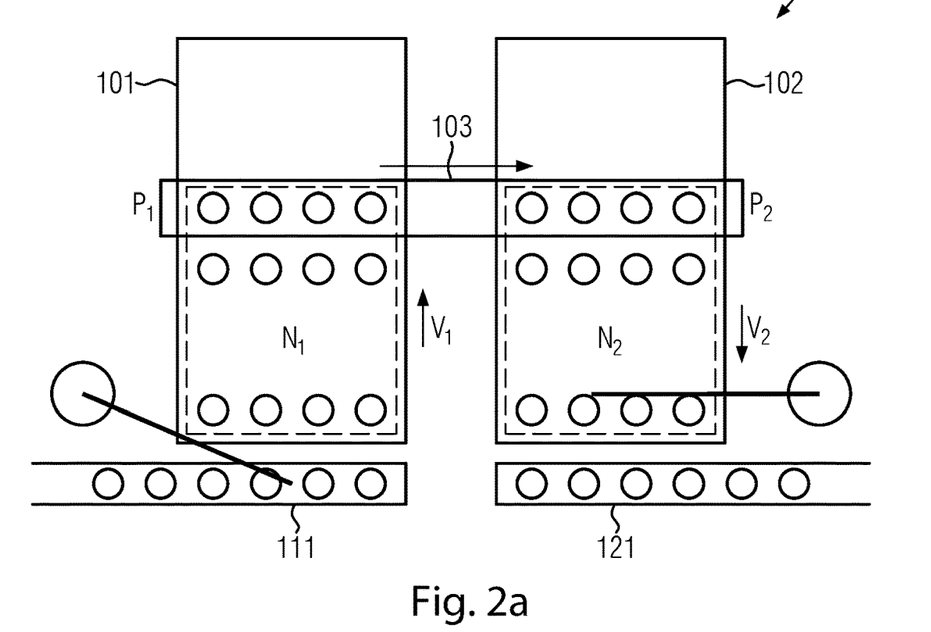
FIGS. 2a and 2b show a change in the buffer capacity of the buffer device according to one embodiment.
Figure 2B:
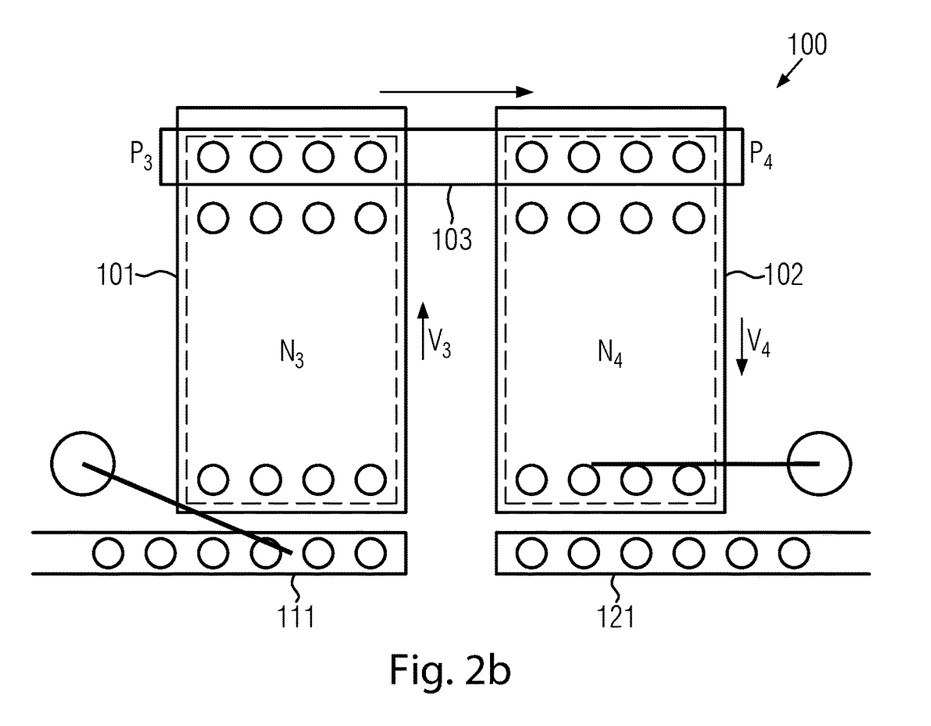

In this regard, FIG. 2 shows a possible embodiment in FIGS. 2a and 2b.

As already explained in FIG. 1, containers are fed with the aid of the inlet manipulator via inlet 111 to the first buffer system. In the first buffer system, a certain number N1 of containers can be buffered in the first buffer system at a certain position P1 of the transposition device and at a transport speed of containers V1 given at the same time. The number of containers that can be buffered in second buffer system 102 is substantially dependent upon position P2 (transfer position) of the containers at which the containers arrive in the second buffer system and also depends on transport speed V2 of the containers. The number of containers N2 that can be buffered in the second buffer system is presently shown schematically.

It is understood that other parameters, such as the transfer frequency or the number of containers transferred and the width of the first and the second buffer system, can also have an influence on the buffer capacity. During the operation of the buffer device, however, the width of the first and the second buffer system is usually invariable. For given containers, the number of containers that can be buffered in one row in the respective buffer systems is therefore prescribed.

FIG. 2b illustrates a state of buffer device 100 in which the buffer capacity has been changed.

As can be seen there, first transfer position P3, at which containers are taken over from first buffer system using transposition device 103, is further away from inlet 111 than is the case in FIG. 1. This means that a larger area is available in the first buffer system for buffering containers. Simultaneously or alternatively, a slower transport speed can be provided so that the containers are transported more slowly along the first buffer system. Both together or each measure individually can lead to number N3 of bufferable containers in first buffer system 101 being greater than number N1 according to FIG. 2a.

Similarly, second transfer position P4, with which containers are introduced into second buffer system 102, can be further away from outlet 121 than was the case in FIG. 2a. Here as well, reduced transport speed in second buffer system 121 can additionally or alternatively be provided. Both measures individually or in combination lead to a number N4 of containers bufferable in the second buffer system.

The sum of N1+N2 or N3+N4 is to be understood to be the buffer capacity.

It is understood that any combination of changed positions P1 and P2 as well as P3 and P4 as well as of speeds V1 and V2 as well as V3 and V4 can be used to adjust the buffer capacity.

In terms of control, it is easiest to have transfer positions P1 and P2 or P3 and P4, respectively, in directions 173 and 175 be identical, so that taking over the containers from the first buffer system and transferring the containers to the second buffer system is then at the same "level". Only one motion, shown according to arrow 174 (see FIG. 1 in this regard), is then necessary.

The buffer capacities of the first and the second buffer system can need to be changed for various reasons. For example, due to a malfunction downstream of the buffer device, the container throughput (i.e. the number of containers per unit of time) downstream of the buffer device can drop from a first value to a second value, while the container throughput of the containers arriving at the inlet remains constant. Assuming the same container throughputs in the inlet and the outlet, an initial (nominal) buffer capacity K can be determined which is associated, for example, with certain transport speeds and transfer positions. If the relationship of container throughput D2 at the outlet to container throughput D1 at the inlet decreases to the ratio $$\frac{D_2}{D_1} < 1,$$

then it is necessary to increase the container capacity in order to prevent the containers from accumulating. The number of containers to be additionally stored in the buffer device arises from $$\frac{D_1}{D_2}\Delta t,$$

where Δt indicates a time interval which, for example, specifies the total duration during which container throughput $D_2$ is lower than container throughput $D_1$. According to this product $$\frac{D_1}{D_2}\Delta t,$$

butter capacity $K_1$ must men be higher than buffer capacity K, i.e.

$$K_1 = K\Delta t\frac{D_1}{D_2}.$$

Corresponding to this new capacity $K_1$, the number N1 or N2, respectively, of the containers that can then be buffered in the first buffer system, and/or the second buffer system can then be increased by, for example, in that the transfer position of the containers from the first buffer system to the second buffer system is changed with the aid of the transposition device. In the alternative or in addition, transport speed V1 or V2 of the containers in the first and/or the second buffer system can also be reduced if the containers in the first buffer system and/or the second buffer system are still transported with gaps (i.e. with a spacing between the containers). By slowing down the transport speed, while the transport speed of the containers in the inlet remains the same, the flow of containers in the first or the second buffer system, respectively, is compacted or the distance between the containers is reduced, respectively, so that the number of containers per unit area increases, whereby the number N2 or N1, respectively, also increases.

Similarly, the buffer capacity can of course also be reduced if the container throughput in the outlet increases relative to the container throughput in the inlet. The same equations as mentioned above are applicable there. If the container throughput increases in the outlet, the containers typically have to be transferred faster from buffer system 102 to outlet 121 with the aid of outlet manipulator 122. In order to presently ensure that outlet manipulator 122 does not "reach for an empty space", i.e. that there are no containers available at a point in time when it is supposed to take over containers for the increased throughput, the transport speed of the containers in the second buffer system can be increased in such a case.

Figure 3:
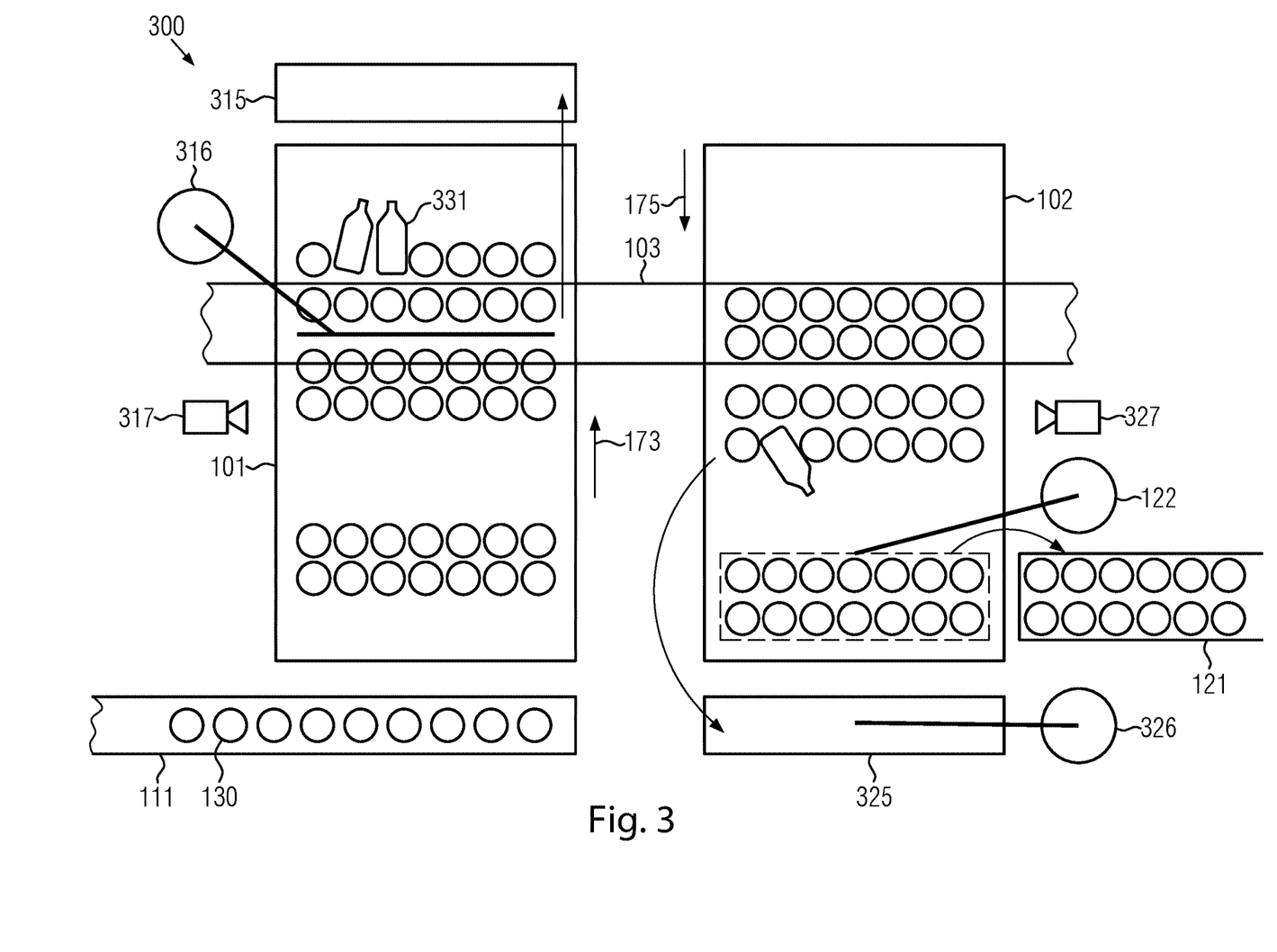
FIG. 3 shows an embodiment of the buffer device with a reject region according to one embodiment.

FIG. 3 shows an embodiment of a buffer device which enables the detection and, based thereupon, the ejection of containers that are damaged and/or have fallen over. For this purpose, a reject region 315 is arranged in direction 173 downstream of first buffer system 101 into which containers can be transferred. As an alternative or in addition to this, a reject region can be arranged in direction 175 downstream of second buffer system 102 into which containers that have been damaged or have fallen over (or the like) can be transferred from the second buffer system.

A fault detection, such as e.g. the optical sensors (cameras or the like) 317 illustrated for buffer system 101 and 327 for buffer system 102, can be provided for detecting that a "fault" is present in a container or several containers. Depending on whether a corresponding reject region is provided for each buffer system, corresponding fault detections and 317 and/or 327 are present. They can be connected to a control unit, such as a computer or the central control device of the buffer system, and an image recognition device (for example software) can be provided which recognizes by way of the images recorded by the sensors whether one or more containers have fallen over.

If this is the case, containers can be transferred from first buffer system 101 into first reject region 315 with the aid of a transfer device 316. Transfer device 316 can be configured as a transfer bar, since the use of grippers is less advantageous for the reason that containers that have fallen over can no longer be gripped in a selective manner by grippers. Transfer device 316 can be configured such that it not only feeds a fallen or damaged container to the reject region, but also feeds an entire group of containers, for example, a row of containers in which at least one container has fallen over, to the reject region. In this way, empty spaces in the form of individual containers of groups of containers to be transported in the buffer system are prevented and any unintentional misalignment of containers or incorrect grouping of containers is prevented. For this purpose, the containers in the first buffer system can be transported in groups (single-row or multiple-row), where one group is either transported through buffer system 101 and transferred by the transposition device onto second buffer system 102 or the entire group is fed to the reject region if a fault in the form of fallen, damaged or otherwise disrupted container is given.

The procedure in second buffer system 102 can be similar.

The respective reject regions can either be configured as bins into which the containers are moved and in which they can be transported away in a completely disorderly manner. If it is envisaged that the containers from the group of containers transferred to the reject region are used in the event that some or several of the containers are not damaged, then the reject region can also comprise one or more container receptacles that can receive the containers in an orderly manner to be able ensure a reliable onward transport, for example, back to the inlet, provided the respective containers have not been damaged.

The same applies to reject region 325 of the second buffer system. It can be provided there that the containers are, for example, either fed to outlet 121 in a newly arranged manner, or again fed to inlet 111 in a newly arranged manner, or are completely separated out.

Figure 4:
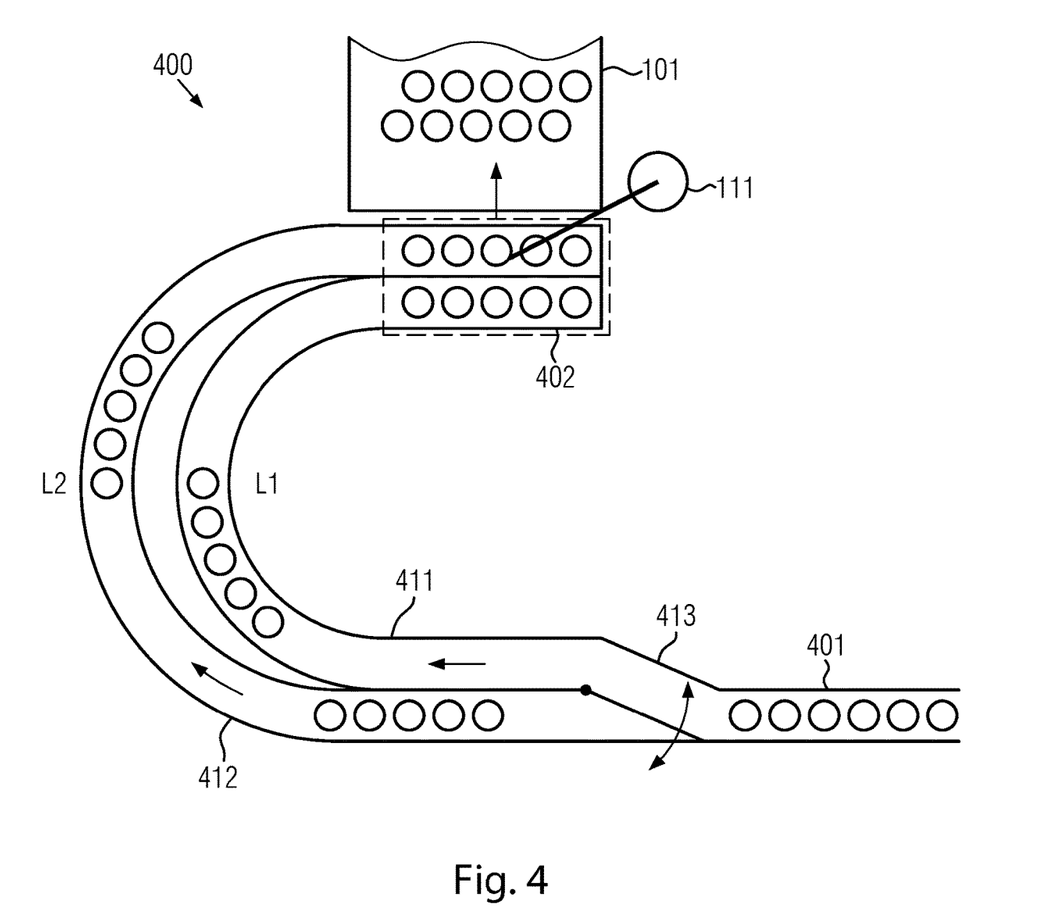
FIG. 4 shows an embodiment of the buffer device with an aisle system.

FIG. 4 shows an embodiment with which the transportation of the containers to the first buffer system and/or the removal of containers from the second buffer system can be adapted to the requirements for transportation in upstream container treatment machines and/or transport devices or in downstream container treatment machines and/or transport devices. For example, containers are fed to the first buffer system in the inlet in several rows (at least two), where each row of containers has the same number of containers and they are also positioned as parallel as possible to one another. On the other hand, the upstream container treatment machine can be configured such that only containers in a single row are transported out therefrom.

For this purpose, the inlet or outlet, respectively, can comprise an aisle system for converting single-row transportation of containers in transport device 401 to multiple-row transportation of containers at the end of transport device 402 (immediately prior to the containers being transferred to first buffer system 101).

In order to implement this rearrangement as simply as possible, it can be provided that individual groups of containers are transported along different conversion tracks 411 and 412. In order to distribute the containers from first transport device 401 to conversion tracks 411 and 412, an allocation device 413, for example, in the form of a position-adjustable pusher, can be provided so that containers can either be fed to first conversion track 411 or onto second conversion track 412 depending on the position of the pusher.

The containers may move at a constant speed in the individual conversion tracks, where the transport speed of the containers in the first conversion track may be equal to the transport speed in the second conversion track. However, the conversion tracks differ in terms of their length. The difference in length can be selected such that it corresponds to an integral multiple of the diameter of the containers transported with the inlet. In an embodiment, this difference in length can be sized such that it corresponds to the number of containers that are transferred per row by the inlet manipulator to the first buffer system. If, for example, ten containers per row are transferred by the inlet manipulator to the first buffer system, then the difference in length L2-L1 can correspond to ten times the diameter of a container. It is understood that the relationship to the diameter is only possible with containers having a circular cross-section. In the case of containers with a non-round cross-section, a width of the container in the direction of transport of the containers or in a direction in which the containers are lined up is selected instead of the diameter. This variant is also comprised where the diameter of the container is mentioned hereafter.

The original flow of containers from the direction of transport 401 is subdivided in one embodiment such that a first number of containers, corresponding to the integer multiple of the diameter of a container by which length L2 is greater than length L1, is transported along the second conversion track with length L2. The immediately adjoining group of containers, the number of which is equal to the number of the first group of containers, is then guided over the first conversion path with length L1 by actuating feed device 413. Due to the specific length of the conversion tracks, the first number from the second conversion track and the second number from the first conversion track simultaneously arrive at adjoining transport device 402 (for example the inlet) and there form the intended double-row group of containers and can then also simultaneously be transferred by the inlet manipulator to the first buffer system.

It is understood that dividing multiple-row transportation of containers in region 402 to a single-row conveyor is possible, when this aisle system is travelled from point 402 to single-row transport device 401 (i.e. precisely with a temporal reversal of the motions and actuation of the feed device). Multiple-row groups of containers (spaced from one another) are there fed to the conveyor in order to then be transported as a single-row arrangement of containers.

For example, it can be provided that the outlet comprises an aisle system 400 that is travelled starting out from second transport device 402, in which the containers are transferred to the outlet by the outlet manipulator, while the inlet is associated with an aisle system 400 which, according to the embodiment described in FIG. 4, is travelled from single-row transportation 401 to multiple-row transport in region 402.

The use of only two different conversion tracks is not restrictive. 3, 4 or more conversion tracks can then also be provided, where, when the conversion tracks are numbered from the smallest to the greatest length, the difference in length ΔL of a given conversion track to the immediately preceding conversion track with a smaller length is always constant and therefore corresponds to an integral multiple to the diameter of containers.

It is advantageous to have the aisle system also be able to be used for containers with different diameters. For this purpose, the difference in length ΔL can be selected such that it also corresponds to an integral multiple of the diameter of the respective container for different (for example two) container sizes used. If, for example, not only bottles, for example, having a diameter of 10 cm, are transported by the aisle system or generally the buffer devices, but if it can also be provided that bottles with a 5 cm diameter are transported following a changeover, then difference in length ΔL can correspond to, for example. 40 cm. This corresponds to four times the diameter of containers having a 10 cm diameter and eight times the diameter of containers having a 5 cm diameter, so that corresponding regrouping is possible for both container formats.

As an alternative or in addition, it can also be provided that conversion tracks 411 and 412 (and any other conversion tracks possibly provided) are of modular configuration and are joined to first transport device 401 and second direction of transport 402 (or the inlet) using only detachable connecting elements such as screws or click connections. They can be exchanged in dependence of the container size.

Figure 5:
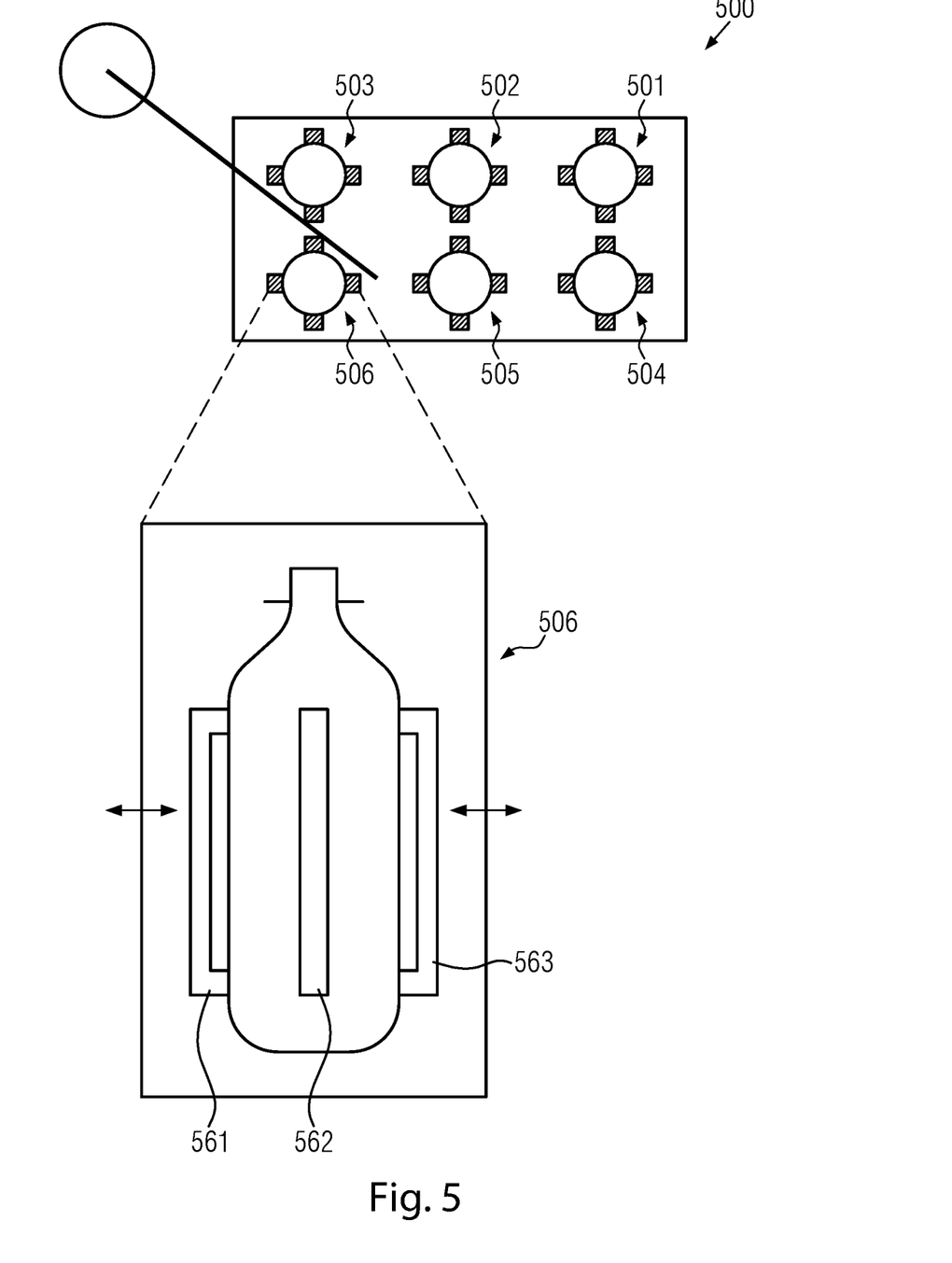
FIG. 5 shows a gripper system for use in an inlet manipulator, outlet manipulator, or transposition device according to one embodiment.

FIG. 5 shows a more detailed embodiment of a device such as can be used in the conversion device, or the inlet manipulator, or the outlet manipulator. Device 500 is presently shown using the inlet manipulator as an example. It comprises several gripper devices for taking up and gripping containers in container receptacles 501 to 506. The gripper devices are shown in more detail using container receptacle 506 as an example. The gripper devices can comprise two or more gripper elements 561 to 563 which can each grip the containers at at least one point. For example, two gripper devices 561 and 562 which grip the container at its support ring can be provided. Alternatively, the gripping devices can also be configured according to the clamp elements presently shown which grip or touch the container along its longitudinal axis at two different points. By capturing the container between at least two gripping devices 561 and 563 and, possibly, using one or more further gripping devices 562, the container can be raised and moved in a positionally secured manner, for example, to be fed from the inlet into the first buffer system or from the first buffer system into the second buffer system or from the second buffer system to the inlet.

The inlet manipulator and/or the transposition device and/or the outlet manipulator can also comprise a gripper system that enables the rearrangement or movement of containers relative to one another such that the containers can be regrouped or their position can be exchanged, for example, depending on a print or the filled product to ensure a certain grouping or arrangement of containers. For example, the transposition device can be configured to take over containers from the first buffer system, in which they are transported, for example, in a single row with 30 containers per row, such that they are grouped to form groups of three containers in two rows in the second buffer system, which then corresponds to 5 groups with 6 containers each. It is understood that any other number of containers and any combination of the number of groups and the rows of containers is also conceivable. In this arrangement, they can then be transferred, for example, to the outlet manipulator and then fed to a packer that creates container packages from these grouped containers. Other embodiments of formatting, grouping or arranging are also conceivable there.

To achieve this, the gripper system can comprise gripper elements that can be moved relative to one another, where the gripper elements associated with a container receptacle (e.g. container receptacle 506) can be moved as a group of gripper elements together and synchronously relative to other groups of gripper elements. For this purpose, for example, guides can be associated with the groups of gripper elements, along which they can be moved in one or more directions. Furthermore, suitable drive devices, such as an actuator, can be associated with the groups of gripper elements, with which the groups of gripper elements can be caused to move along the guides.

The guides can be long stator linear drives that comprise one or more current-carrying coils that can generate a controllable electromagnetic field along the long stator. In this embodiment, each gripper element or at least each group of grippers comprises a mover which is arranged to be movable along the long stator linear drive and can interact with the electromagnetic field generated. For this purpose, each mover can comprise a secondary element which in turn can comprise ferromagnetic material such as iron. The secondary element then interacts with the electromagnetic field, causing a motion of the mover along the long stator (due to the Lorentz force).

The invention claimed is:

1. A buffer device for buffering containers with an inlet, an inlet manipulator, a first buffer system, a transposition device, a second buffer system, an outlet manipulator, and an outlet, where containers can be transferred by said inlet manipulator from said inlet to said first buffer system and can be transported along a first direction in said first buffer system, where said transposition device can transfer containers from said first buffer system to said second buffer system, and said containers can be transported in said second buffer system along a second direction that is opposite to the first direction, and said containers can be removed from said second buffer system by said outlet manipulator and fed to said outlet, where a buffer capacity of said buffer device is adjustable, where the transposition device comprises a gripper system or a transfer bar for transferring containers from the first buffer system to said second buffer system, and where said transposition device is arranged to be movable parallel to the first and/or the second direction and the buffer capacity can be adjusted by said transposition device adjusting a transfer position of said containers.

2. The buffer device according to claim 1, where said inlet manipulator comprises a gripper system for gripping a number of containers; and/or
where said outlet manipulator comprises a gripper system for gripping a number of containers.

3. The buffer device according to claim 1, where said inlet manipulator and/or said outlet manipulator and/or said transposition device are configured to format and/or regroup containers.

4. The buffer device according to claim 1, where a first reject region, into which containers can be moved from said first buffer system, is arranged along the first direction downstream of said first buffer system; and/or
where a second reject region, into which containers can be moved from said second buffer system, is arranged along the second direction downstream of said second buffer system.

5. The buffer device according to claim 1, where said inlet is configured to transport containers in a single row and/or said outlet is configured to transport containers in multiple rows.

6. The buffer device according to claim 1, where said transposition device is configured to rearrange containers and/or to change a spacing of containers in said first buffer system and/or in said second buffer system in dependence of one or more properties.

7. The buffer device according to claim 1, where said inlet and/or said outlet comprises an aisle system for converting single-row transportation of containers into multiple-row transportation of containers, where said aisle system comprises a first conveyor in which containers are transported in a single row, and a second conveyor downstream of said first conveyor in which said containers are transported in at least two rows that are parallel to each other, where at least two conversion tracks are arranged between said first conveyor and said second conveyor and where an allocation device is provided which can feed said containers transported in said first conveyor alternately to a first conversion track and to a second conversion track, where length L1 of said first conversion track and length L2 of said second conversion track differ from one another and the difference $\Delta L = L2 - L1 > 0$ corresponds to an integral multiple of said containers to be transported with said inlet.

8. A method for buffering containers with a buffer device which comprises an inlet, an inlet manipulator, a first buffer system, a transposition device, a second buffer system, an outlet manipulator, and an outlet, where containers are transferred by said inlet manipulator from said inlet to said first buffer system and are transported along a first direction in said first buffer system, where said transposition device transfers containers from said first buffer system to said second buffer system, and said containers are transported in said second buffer system along a second direction that is opposite to the first direction, and said containers are removed from said second buffer system by said outlet manipulator and fed to said outlet, where a buffer capacity of said buffer device is adjusted in dependence of a number of containers to be buffered, where the transposition device comprises a gripper system or a transfer bar that transfers containers from the first buffer system to said second buffer system, and where said transposition device is arranged to be movable parallel to the first and/or the second direction and the buffer capacity is adjusted by said transposition device adjusting a transfer position of said containers.

9. The method according to claim 8, where a transport speed of said containers in said first buffer system along the first direction is constant and a transport speed of said containers in the second buffer system along the second direction is varied in dependence of a ratio between a container throughput in the first buffer system and a container throughput in the second buffer system.

10. The method according to claim 8, where said inlet manipulator and/or said outlet manipulator and/or said transposition device groups and/or formats containers during transportation.

11. The method according to claim 8 where a fault detection can be provided which detects a fault in at least one container in said first and/or said second buffer system and where a container, when a fault is detected, is fed from said first buffer system to a first reject region or from said second buffer system to a second reject region.

12. The method according to claim 8, where said transposition device rearranges containers and/or changes a spacing of containers in said first buffer system and/or in said second buffer system in dependence of one or more properties.

13. The method according to claim 8, where said inlet and/or said outlet comprises an aisle system for converting single-row transportation of containers into multi-row transportation of containers, where said aisle system comprises a first conveyor in which containers are transported in a single row, and a second conveyor downstream of said first conveyor in which said containers are transported in at least two rows that are parallel to each other, where at least two conversion tracks are arranged between said first conveyor and said second conveyor, and where an allocation device is provided which feeds said containers transported in said first conveyor alternately to a first conversion track and to a second conversion track, where length L1 of said first conversion track and length L2 of said second conversion track differ from one another and the difference $\Delta L = L2 - L1 > 0$ corresponds to an integral multiple of said containers transported with said inlet, where said allocation device first feeds a first number of containers, a total length of which corresponds to $\Delta L$, to said second conversion track and feeds a second number of containers immediately following the first number of containers in said first conveyor to said second conversion track, where the first number of containers and the second number of containers are equal.

* * * * *